(12) United States Patent
Bao et al.

(10) Patent No.: US 10,455,059 B2
(45) Date of Patent: *Oct. 22, 2019

(54) SENDING MESSAGES TO MOBILE DEVICES

(71) Applicant: Verizon Patent and Licensing Inc., Arlington, VA (US)

(72) Inventors: Guanqun Bao, Sunnyvale, CA (US); Okeno R. Palmer, Oakland, CA (US); Saumitra Kumar, Sunnyvale, CA (US); Harsha Vardhana Reddy Hardhagari, Mountain View, CA (US); Gaurav Gupta, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,834

(22) Filed: Oct. 12, 2018

(65) Prior Publication Data
US 2019/0052731 A1    Feb. 14, 2019

Related U.S. Application Data

(63) Continuation of application No. 15/095,776, filed on Apr. 11, 2016, now Pat. No. 10,135,946.

(51) Int. Cl.
*H04L 29/08* (2006.01)
*H04W 4/50* (2018.01)
(Continued)

(52) U.S. Cl.
CPC ............. *H04L 67/34* (2013.01); *H04L 51/24* (2013.01); *H04L 67/125* (2013.01); *H04L 67/20* (2013.01);
(Continued)

(58) Field of Classification Search
CPC ......... H04L 51/04; H04L 51/24; H04L 67/20; H04L 67/26; H04L 67/34; H04L 67/125; H04W 4/14; H04W 4/50
(Continued)

(56) References Cited

U.S. PATENT DOCUMENTS

2005/0278717 A1   12/2005  Asai
2010/0153836 A1*   6/2010  Krassner ................. H04L 67/22
                                                                       715/234

(Continued)

OTHER PUBLICATIONS

Wikipedia, "Mobile backend as a service,"https://en.wikipedia.org/wiki/Mobile_backend_as_a_service, Mar. 20, 2016, 3 pages.

*Primary Examiner* — Michael Y Mapa

(57) ABSTRACT

A device may receive a request for a mobile device to obtain an application. The request may include a mobile device identifier for the mobile device. The device may send, to the mobile device, a link to a web page. The device may receive, from the mobile device, a request for the web page. The device may send, to the mobile device, a redirect to a software distribution platform to obtain the application from the software distribution platform. The device may receive a registration identifier for the mobile device after the mobile device obtains the application from the software distribution platform. The device may send, to a message server, a request for a message to be sent to the mobile device. The request may be based on the registration identifier and the application.

20 Claims, 7 Drawing Sheets

(51) Int. Cl.
*H04L 12/58* (2006.01)
*H04W 4/14* (2009.01)

(52) U.S. Cl.
CPC ............... *H04L 67/26* (2013.01); *H04W 4/14* (2013.01); *H04W 4/50* (2018.02); H04L 51/04 (2013.01)

(58) Field of Classification Search
USPC .................................................. 455/418–420
See application file for complete search history.

(56) References Cited

U.S. PATENT DOCUMENTS

| | | | |
|---|---|---|---|
| 2012/0173610 A1* | 7/2012 | Bleau | H04L 67/26 709/203 |
| 2012/0222129 A1* | 8/2012 | Racciopi | G06F 21/57 726/27 |
| 2013/0124606 A1* | 5/2013 | Carpenter | H04L 67/06 709/203 |
| 2013/0254024 A1* | 9/2013 | Woods | G06Q 30/02 705/14.51 |
| 2014/0164909 A1* | 6/2014 | Graff | G06F 17/30899 715/234 |
| 2014/0278927 A1* | 9/2014 | Close | G06Q 30/0246 705/14.45 |
| 2015/0082212 A1* | 3/2015 | Sharda | H04L 67/26 715/764 |
| 2016/0234686 A1 | 8/2016 | Bone | |
| 2016/0360010 A1 | 12/2016 | Manj | |
| 2017/0013070 A1* | 1/2017 | Comstock | H04L 67/22 |

\* cited by examiner

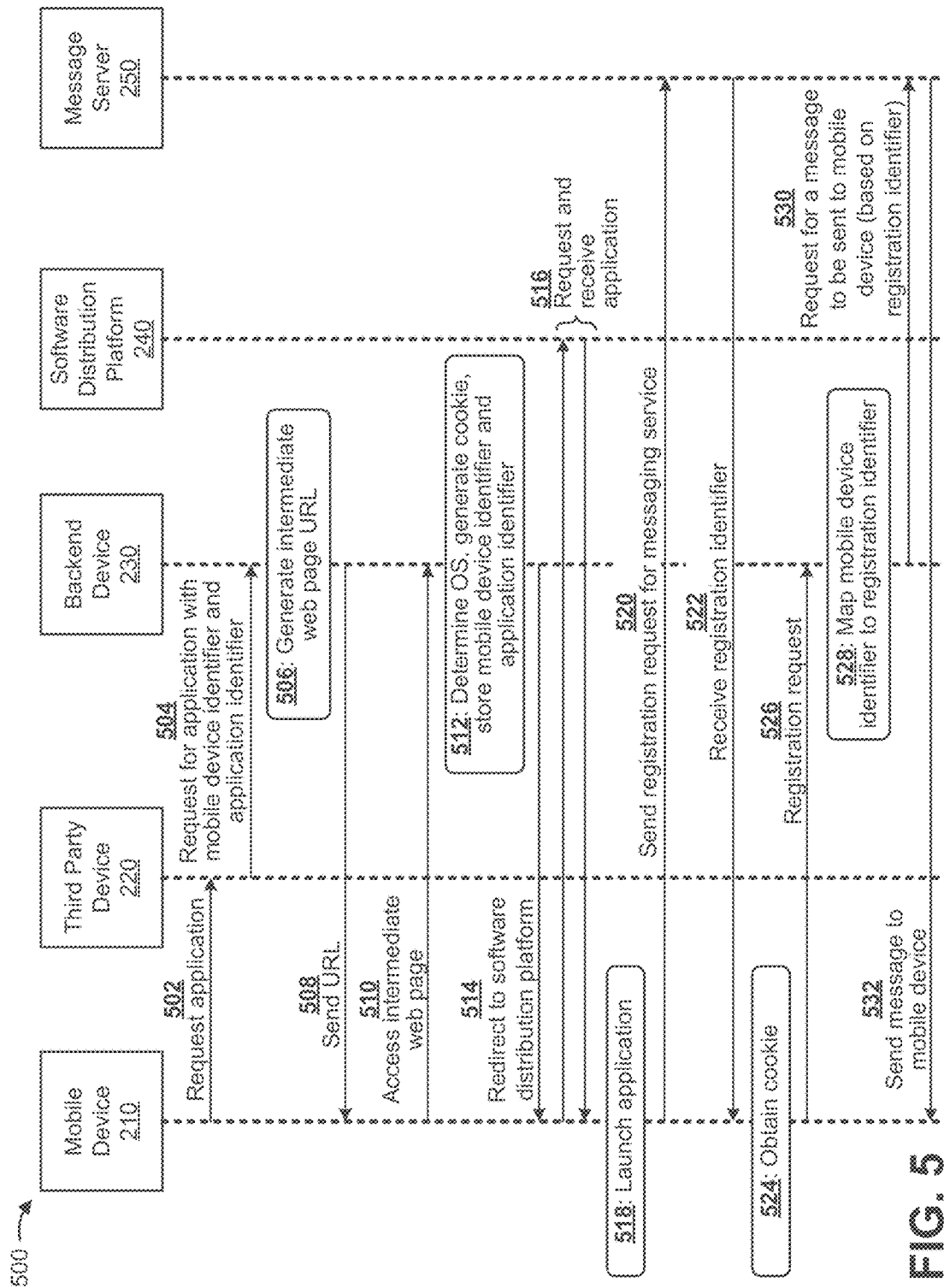

SENDING MESSAGES TO MOBILE DEVICES

RELATED APPLICATION

This application is a continuation of U.S. patent application Ser. No. 15/095,776, filed Apr. 11, 2016, which is incorporated herein by reference.

BACKGROUND

Mobile devices may include various applications (e.g., mobile apps). Various entities, including entities associated with the applications, may use a messaging service provider to send messages (e.g., push notifications) to mobile devices, to applications on mobile devices, and/or to users of the mobile devices and applications.

BRIEF DESCRIPTION OF THE DRAWINGS

FIG. 5 is a call flow diagram of an example call flow for sending messages to mobile devices.

DETAILED DESCRIPTION OF PREFERRED EMBODIMENTS

The following detailed description of example implementations refers to the accompanying drawings. The same reference numbers in different drawings may identify the same or similar elements.

A third party (e.g., an application provider) may desire to direct mobile devices and/or users of mobile devices to specific content and/or to specific portions of an application on a mobile device. When a mobile device obtains an application that is associated with a third party (e.g., the application provider), the third party may obtain a mobile device identifier (e.g., a mobile device number (MDN), an international mobile subscriber identity (IMSI), or a temporary mobile subscriber identity (TMSI)) for the mobile device. If the mobile device is to receive push notifications (e.g., on behalf of the third party), the mobile device may need to register with a message server, which may be operated by a messaging provider. The message server may assign a registration identifier to the mobile device, such that the message server may send messages (e.g., push notifications) to the mobile device based on the registration identifier. As the message server may not be associated with the third party, there may not be any correlation between the mobile device identifier for the mobile device (which is known to the third party) and the registration identifier assigned by the message server, to the mobile device. Implementations described herein may create a mapping between a mobile device identifier for a mobile device and a registration identifier (received from a message server) such that a third party may have messages (e.g., push notifications) sent to the mobile device, by the message server, based on the mobile device identifier.

Although generally described in the context of mobile devices, the implementations described herein may also be applicable to applications (e.g., mobile apps) on mobile devices. For example, an application on a mobile device may interact with a server and/or a mobile backend to support access to an enterprise system associated with the application. Thus, one or more interactions with a mobile device (e.g., messages being sent to and/or from a mobile device), as described herein, may, in some implementations, correspond to one or more interactions with an application (e.g., a mobile app) on the mobile device. Furthermore, activity targeting a mobile device (e.g., messages being sent to the mobile device) should be understood as additionally, or alternatively, referring to activity targeting a user of the mobile device (e.g., messages targeting a user of the mobile device).

Figure 1A:
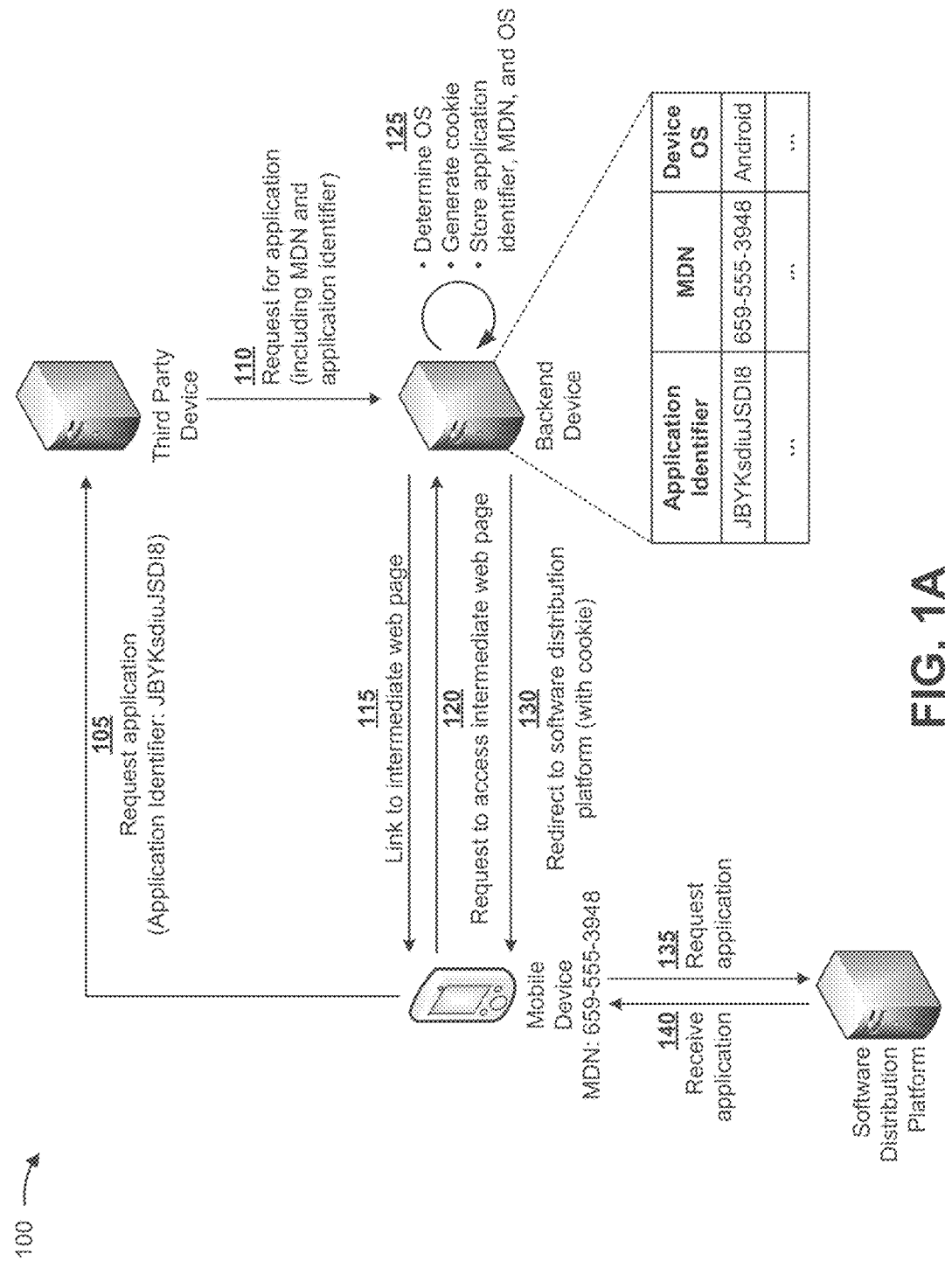
FIGS. 1A-1C are diagrams of an overview of an example implementation described herein.
Figure 1B:
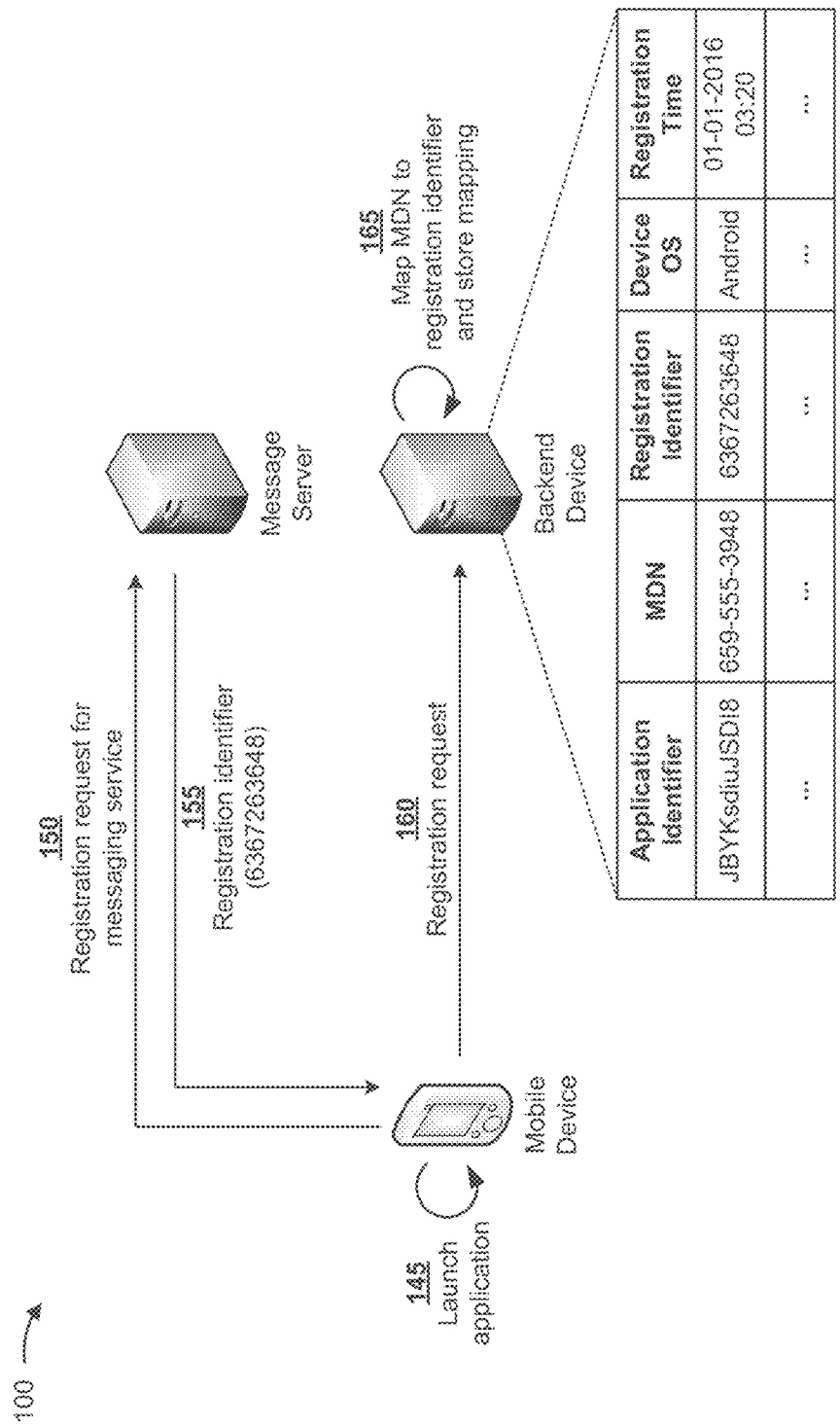
Figure 1C:
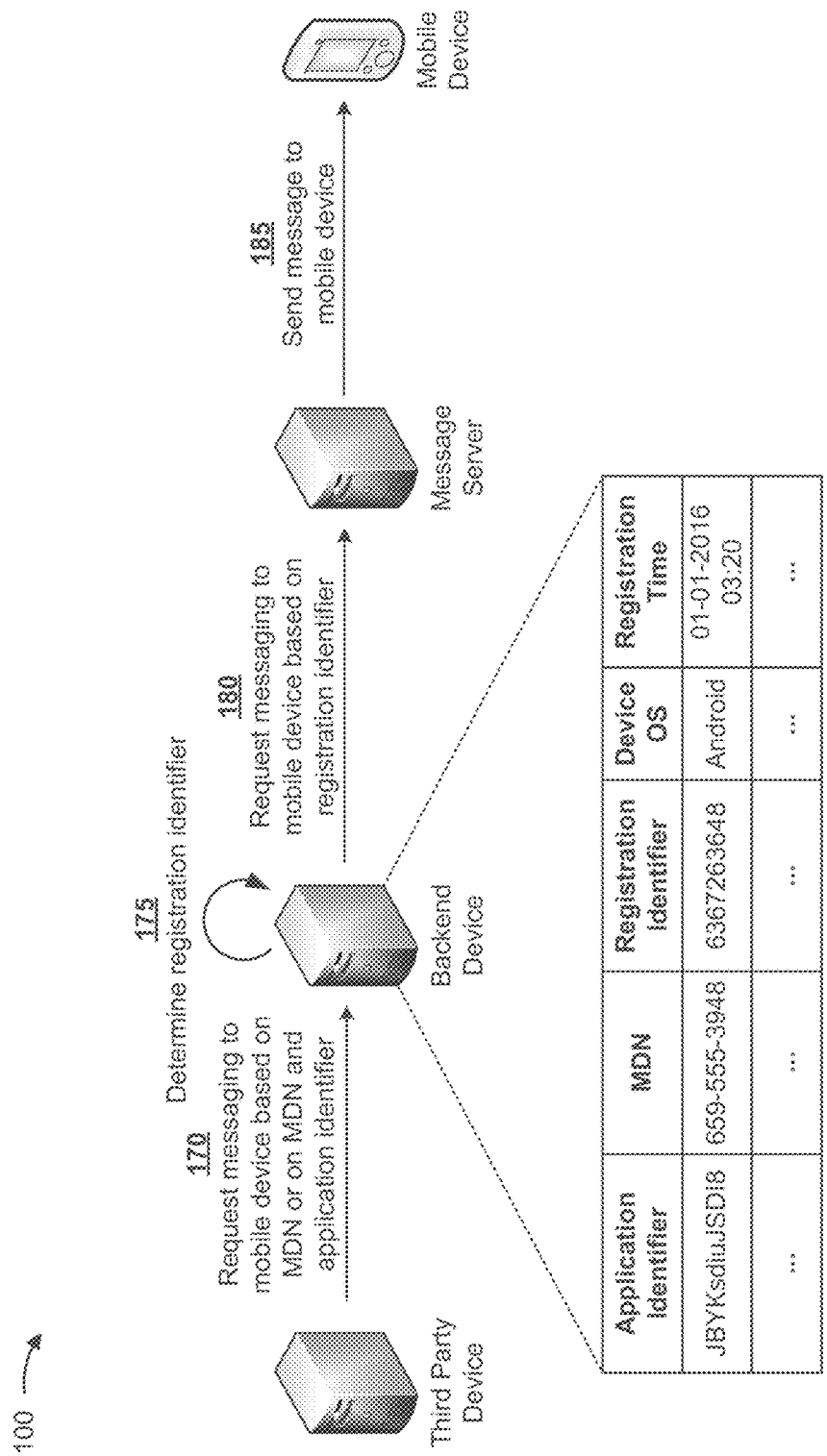

FIGS. 1A-1C are diagrams of an overview of an example implementation 100 described herein. As shown in FIG. 1A, assume that a mobile device seeks to obtain an application (e.g., based on interactions between the mobile device and the third party device, such as interactions by a user of the mobile device with an interactive voice response (IVR) system or web site associated with the third party device). Further assume that the mobile device has a mobile device identifier (e.g., the mobile device's MDN: 659-555-3948) and that an application identifier (e.g., JBYKsdiuJSDI8) is associated with the application.

As shown in FIG. 1A, and by reference number 105, the mobile device may send, to the third party device, a request for the application based on the application identifier. As shown by reference number 110, the third party device may send, to a backend device and based on the request from the mobile device, a request for the application, with the request including the MDN for the mobile device and the application identifier for the application. As shown by reference number 115, the backend device may send, to the mobile device, a link to an intermediate web page hosted on the backend device. The intermediate web page may support redirecting the mobile device to a software distribution platform where the mobile device may obtain the application. As shown by reference number 120, the mobile device may generate and send (e.g., based on a user clicking on the link) a request, to the backend device, to access the intermediate web page. As shown by reference number 125, when the backend device receives the request to access the intermediate web page, the backend device may determine, based on the request, an operating system (OS) (e.g., the Android OS) being used by the mobile device. As further shown by reference number 125, the backend device may generate a session cookie based on the mobile device's MDN and may store the application identifier, along with the mobile device's MDN and OS.

As shown by reference number 130, the backend device may send, to the mobile device and based on the request to access the intermediate web page, a redirect to the software distribution platform along with the session cookie. The redirect may be to a software distribution platform that provides applications compatible with the mobile device's OS (e.g., as determined by the backend device based on the request to access the intermediate web page). Based on the redirect to the software distribution platform, the mobile device may request (as shown by reference number 135) and receive (as shown by reference number 140) the application from the software distribution platform.

As shown in FIG. 1B, and by reference number 145, the mobile device may launch the application. As shown by reference number 150, when the application is launched (e.g., for the first time), the application may cause the mobile device to send, to a message server (e.g., a push notification service provider), a registration request for a messaging service. As shown by reference number 155, the mobile device may receive a registration identifier (e.g., 6367263648), from the message server, based on the request for the messaging service.

As shown by reference number 160, the mobile device may send, to the backend device, a registration request, which may include the session cookie that is based on the mobile device's MDN and the registration identifier that was received from the message server. As shown by reference number 165, the backend device may receive the registration request and may map the mobile device's MDN (e.g., from the session cookie) to the registration identifier. The backend device may store the mapping of the mobile device's MDN to the registration identifier, along with other information (e.g., the application identifier, the mobile device's OS, and a registration time (e.g., the time when the mobile device obtained the registration identifier)).

As shown in FIG. 1C, assume that the third party device seeks to have the message server send a message (e.g., a push notification) to the user device. In some implementations, the message may direct the application, or the user of the mobile device, to specific content and/or a specific location within the application installed on the mobile device. As shown by reference number 170, the third party device may send, to the backend device, a request for messaging to the mobile device. The request, sent by the third party device, may be based on the mobile device's MDN. In some implementations, the request may be based on the mobile device's MDN and the application identifier.

As shown by reference number 175, the backend device may receive the request and may determine, based on the mapping of the mobile device's MDN to the registration identifier, a registration identifier for mobile device. As shown by reference number 180, and based on the request received from the third party device, the backend device may send, to the message server, a request for messaging to mobile device. The request, sent by the backend device, may be based on the registration identifier. As shown by reference number 185, the message server (e.g., based on the request from the backend device) may send a message to the mobile device.

In this way, implementations described herein may create a mapping between a mobile device identifier for a mobile device (e.g., the mobile device's MDN, IMSI, or TMSI) and a registration identifier (received from a message server). Mapping a mobile device identifier to a registration identifier may enable sending messages (e.g., push notifications) to particular mobile devices based on mobile device identifiers of the particular mobile devices. Sending messages (e.g., push notifications) to particular mobile devices based on mobile device identifiers (e.g., mobile device identifiers that are known by a third party) may reduce network resources consumed by sending the messages because the third party may send the messages to targeted mobile devices rather than sending messages indiscriminately to mobile devices. Additionally, enabling the third party to have messages sent to mobile devices based on mobile device identifiers, which are known by the third party, may reduce computing resources that might be expended by the third party device to determine registration identifiers assigned to the mobile devices.

As indicated above, FIGS. 1A-1C are provided merely as an example. Other examples are possible and may differ from what was described with regard to FIGS. 1A-1C.

Figure 2:
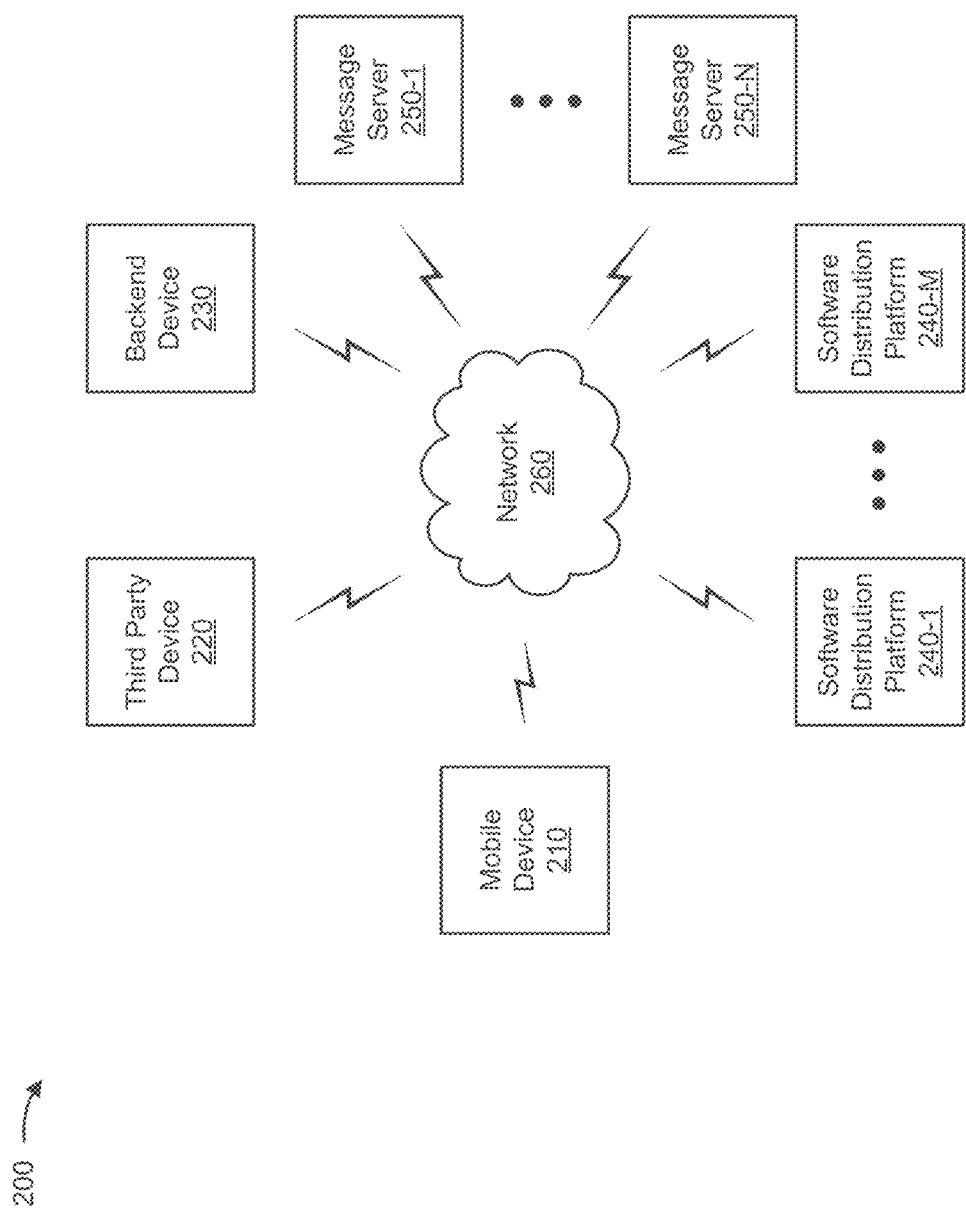
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, a third party device 220, a backend device 230, one or more software distribution platforms 240-1 through 240-M (M≥1) (hereinafter referred to collectively as "software distribution platforms 240," and individually as "software distribution platform 240"), one or more message servers 250-1 through 250-N (N≥1) (hereinafter referred to collectively as "message servers 250," and individually as "message server 250"), and a network 260. Devices of environment 200 may interconnect via wired connections, wireless connections, or a combination of wired and wireless connections.

Mobile device 210 includes one or more devices capable of communicating via a network (e.g., network 260). For example, mobile device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses or a smart watch), a machine device, and/or a similar device. Mobile device 210 may send traffic to and/or receive traffic from network 260 (e.g., via a suitable wireless access point or a base station associated with a cellular network, such as an evolved Node B (eNB) associated with a long-term evolution (LTE) network). In some implementations, mobile device 210 may include and/or receive suitable software (e.g., a library, an application programming interface (API), or a software development kit (SDK)) to support interactions between mobile device 210 and backend device 230.

Third party device 220 includes one or more devices, such as one or more server devices (e.g., a content server, a host server, a web server, an application server, a database server, a voice portal server, a payment processing server, a credit card processing server, or the like). The one or more server devices of third party device 220 may be capable of receiving, generating, storing, processing, and/or providing information associated with a third party service and/or third party content (e.g., an application supported by third party device 220). In some implementations, third party device 220 may be capable of communicating with mobile device 210 and backend device 230, such as via network 260.

In some implementations, third party device 220 may include an interactive voice response (IVR) system. An IVR system may allow third party device 220 to interpret a human caller's response to voice prompts through use of speech recognition and/or dual-tone multi-frequency (DTMF) decoding of tones input via a telephone keypad (e.g., on mobile device 210). For example, an IVR system may allow a caller to service the caller's inquiries by following and responding to a dialogue provided by the IVR system.

Backend device 230 includes one or more devices, such as one or more server devices, capable of communicating with mobile device 210, third party device 220, software distribution platform 240, and/or message server 250, such as via network 260. In some implementations, backend device 230 may be capable of processing and/or storing information received, directly or indirectly, from one or more of mobile device 210, third party device 220, software distribution platform 240, and/or message server 250. In some implementations, backend device 230 may be an application server associated with an application (e.g., a mobile app) on mobile device 210. For example, backend device 230 may provide a mobile back-end that may support access to an enterprise system associated with an application on mobile device 210. In some implementations, a single entity may operate backend device 230 and third party device 220. In some implementations, separate entities may operate backend device 230 and third party device 220. In some implementations, an entity may operate third party device 220 on behalf of a third party.

Software distribution platform 240 includes one or more devices, such as one or more server devices, capable of providing applications to mobile device 210. As used herein, an application may be a computer program (e.g., a mobile app) that is designed to run on a mobile device (e.g., mobile device 210). In some implementations, software distribution platform 240 may be a digital distribution platform that provides applications for a particular mobile device operating system (e.g., an app store or app marketplace, such as Google Play, operated by Google to support the Android OS, the Amazon Appstore, operated by Amazon.com to support the Android OS, the App Store, operated by Apple Inc. to support the iPhone OS (iOS), or the Windows Store, operated by Microsoft to support Windows-powered devices).

Message server 250 includes one or more devices, such as one or more server devices, capable of sending a message (e.g., a notification) to mobile device 210. In some implementations, the message may be a push notification, the sending of which was initiated by a publisher or server (e.g., by third party device 220, by backend device 230, or by message server 250), rather than the message having been requested by mobile device 210 (e.g., as with a pull notification). In some implementations, message server 250 may be associated with a push notification service (e.g., the Apple Push Notification Service (APNs) operated by Apple Inc. for devices using the iPhone OS operating system, the Google Cloud Messaging (GCM) service operated by Google for devices using the Android OS, or the like), which may send messages (e.g., push notifications) regarding third party applications to mobile device 210.

Network 260 may include one or more wired and/or wireless networks. For example, network 260 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
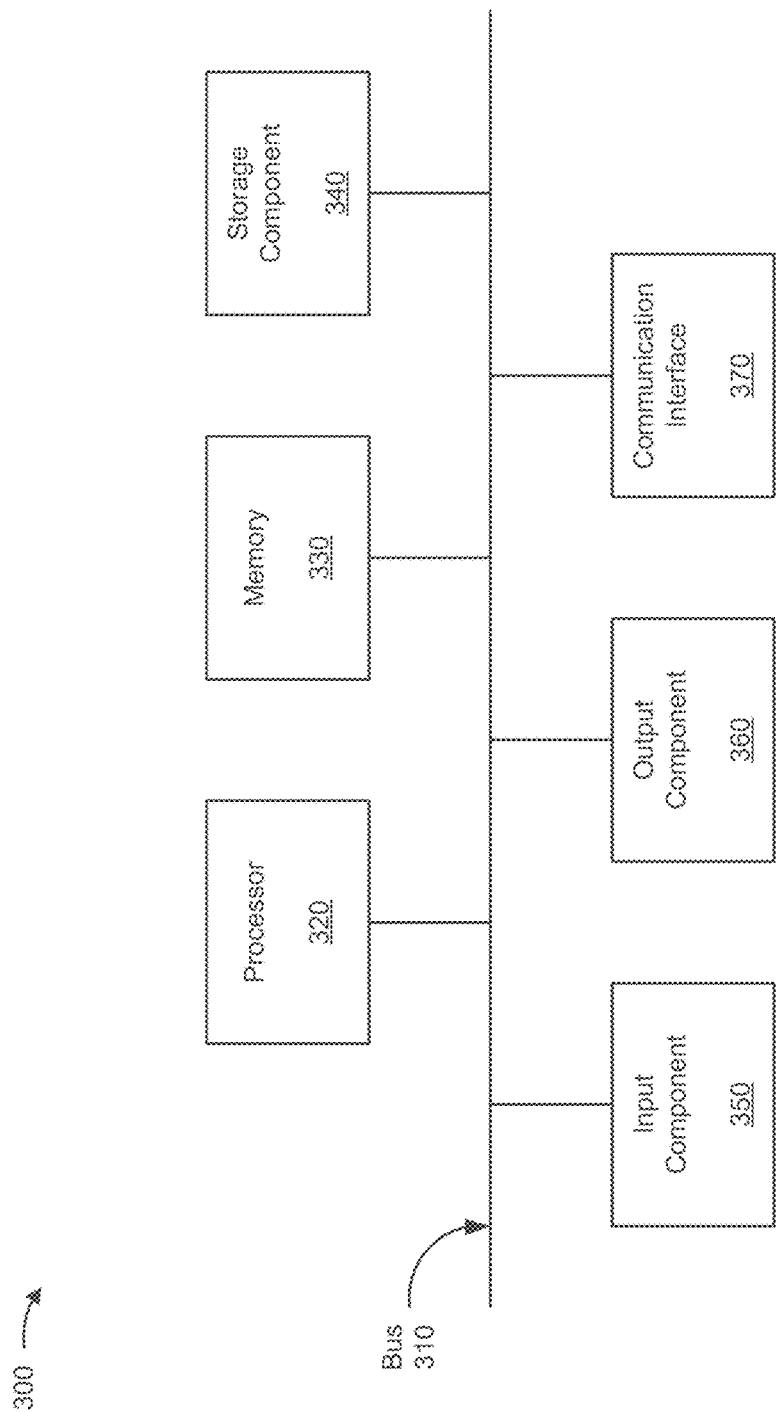
FIG. 3 is a diagram of example components of one or more devices of FIG. 2.

FIG. 3 is a diagram of example components of a device 300. Device 300 may correspond to mobile device 210, third party device 220, backend device 230, software distribution platform 240, and/or message server 250. In some implementations, mobile device 210, third party device 220, backend device 230, software distribution platform 240, and/or message server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), an accelerated processing unit (APU), etc.), a microprocessor, a microcontroller, and/or any processing component (e.g., a field-programmable gate array (FPGA) or an application-specific integrated circuit (ASIC)) that interprets and/or executes instructions. In some implementations processor 320 may include one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, or a microphone). Additionally, or alternatively, input component 350 may include a sensor for sensing information (e.g., a global positioning system (GPS) component, an accelerometer, a gyroscope, or an actuator). Output component 360 includes a component that provides output information from device 300 (e.g., a display, a speaker, or one or more light-emitting diodes (LEDs)).

Communication interface 370 includes a transceiver-like component (e.g., a transceiver or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
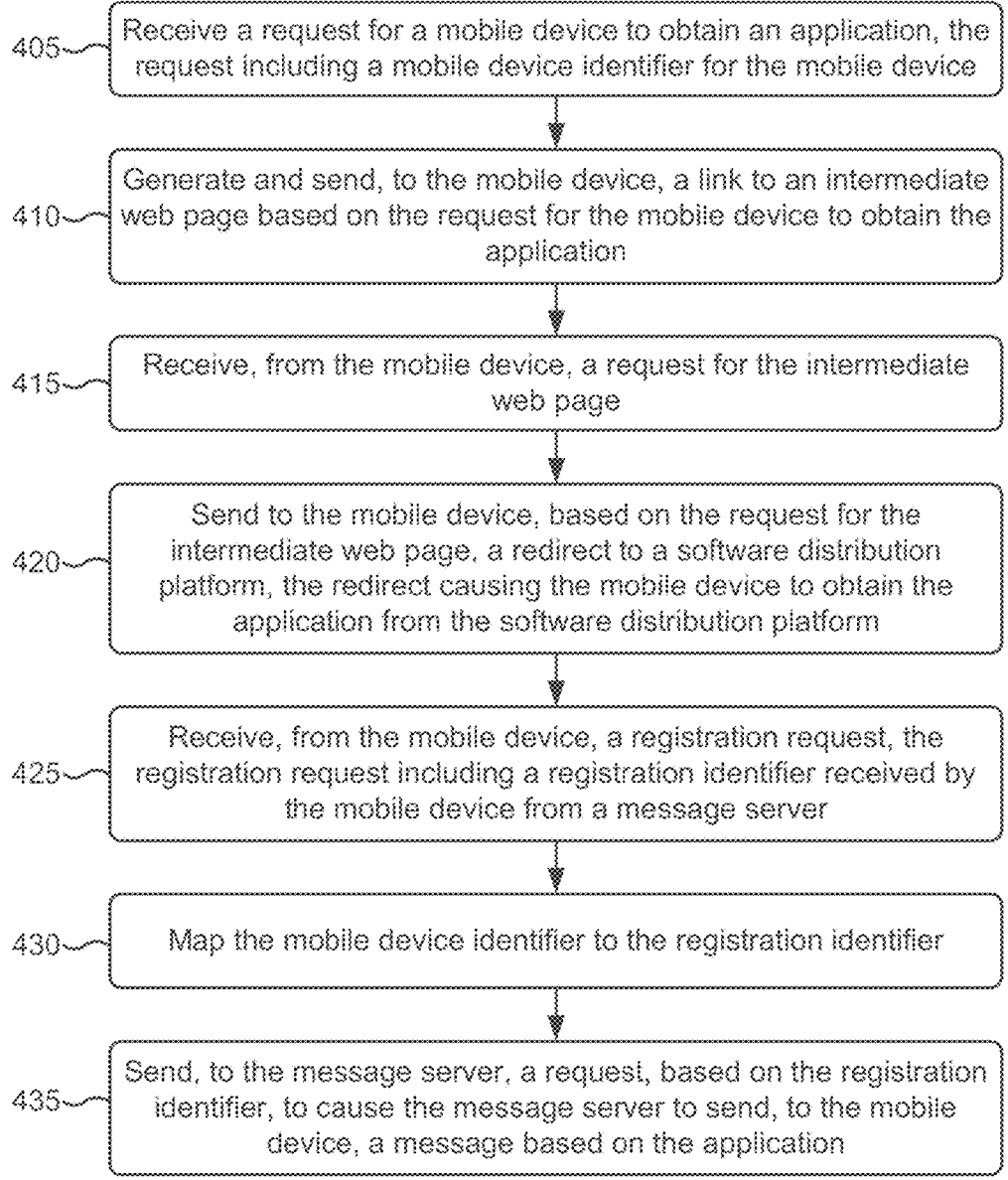
FIG. 4 is a How chart of an example process for sending messages to mobile devices.

FIG. 4 is a flow chart of an example process 400 for sending messages to mobile devices. In some implementations, one or more process blocks of FIG. 4 may be performed by backend device 230. In some implementations, one or more process blocks of FIG. 4 may be performed by another device or a group of devices separate from or including backend device 230, such as mobile device 210, third party device 220, software distribution platform 240, and/or message server 250.

As shown in FIG. 4, process 400 may include receiving a request for a mobile device to obtain an application, the request including a mobile device identifier for the mobile device (block 405). For example, backend device 230 may receive a request for mobile device 210 to obtain an application. The request, for mobile device 210 to obtain the application, may include a mobile device identifier (e.g., a mobile device number (MDN), an international mobile subscriber identity (IMSI), or a temporary mobile subscriber identity (TMSI)) for mobile device 210. In some implementations, backend device 230 may receive the request, for mobile device 210 to obtain the application, from third party device 220.

In some implementations, mobile device 210 may have requested the application from third party device 220. For example, third party device 220 may include an IVR system, and a caller may use mobile device 210 to contact the IVR system (e.g., to obtain services associated with third party device 220). While the caller is using mobile device 210 to interact wits the IVR system, the IVR system (e.g., third party device 220) may, for example, suggest that mobile device 210 obtain the application (e.g., as a way for the caller to obtain the services associated with third party device 220). Based on the suggestion, the caller may elect to obtain the application (e.g., for mobile device 210 to obtain the application) by providing an appropriate input via the IVR system. Alternatively, a user may be using mobile device 210 to interact with a web site associated with third party device 220, and the web site may, for example, suggest that mobile device 210 obtain the application (e.g., as a way to obtain services associated with third party device 220). Based on the suggestion, the user may elect to obtain the application (e.g., for mobile device 210 to obtain the application) by providing an appropriate input via the web site.

In some implementations, backend device 230 may receive a mobile device identifier, for mobile device 210, from third party device 220. In some implementations, third party device 220 may obtain a mobile device identifier, for mobile device 210, explicitly from mobile device 210 (e.g., where mobile device 210 provides the mobile device identifier to third party device 220). In some implementations, third party device 220 may implicitly obtain a mobile device identifier for mobile device 210 (e.g. via caller ID).

In some implementations, the request, for mobile device 210 to obtain the application, may include an application identifier. The application identifier may identify the application that mobile device 210 requested (e.g., from third party device 220).

As shown in FIG. 4, process 400 may include generating and sending, to the mobile device, a link to an intermediate web page based on the request for the mobile device to obtain the application (block 410). For example, backend device 230 may generate and send, to mobile device 210, a link to an intermediate web page. In some implementations, backend device 230 may send the link (e.g., a uniform resource locator (URL) for the intermediate web page) to mobile device 210 via a short message service (SMS) message. In some implementations, backend device 230 may send the link, to mobile device 210, in response to the request, received from third party device 220, for mobile device 210 to obtain the application.

In some implementations, the link to the intermediate web page may point to the domain of backend device 230. For example, the intermediate web page may be hosted by backend device 230.

The intermediate web page may be based on the request for mobile device 210 to obtain the application. For example, the intermediate web page may allow backend device 230 to redirect mobile device 210 (e.g., when mobile device 210 requests access to the intermediate web page) to software distribution platform 240 to obtain the application (as will be discussed below).

In some implementations, backend device 230 may generate the intermediate web page based on a mobile device identifier for mobile device 210 and the application identifier for the application requested by mobile device 210. For example, backend device 230 may generate a unique URI, for each pairing of a mobile device identifier and an application identifier. In some implementations, the link may include information regarding a mobile device identifier for mobile device 210.

As shown in FIG. 4, process 400 may include receiving, from the mobile device, a request for the intermediate web page (block 415). For example, backend device 230 may receive, from mobile device 210, a request for the intermediate web page.

In some implementations, the request (e.g., a hypertext transfer protocol-secure (HTTPS) get request) for the intermediate web page may be initiated by a user of mobile device 210. For example, the user may click on a link (e.g., the URL for the intermediate web page) in the SMS message that was sent to mobile device 210, which may cause mobile device 210 to generate and transmit the request for the intermediate web page.

In some implementations, backend device 230 may determine an OS (e.g., the Android OS, the iPhone OS (iOS), or the Windows OS) being used by mobile device 210 baaed on the request, received from mobile device 210, for the intermediate web page. For example, backend device 230 may determine mobile device 210's OS based on a header portion (e.g., the hypertext transfer protocol (HTTP) header field "User-Agent") of the request for the intermediate web page.

In some implementations, backend device 230 may generate a session cookie (e.g., an HTTP cookie) based on the request for the intermediate web page. For example, backend device 230 may generate a session cookie for mobile device 210 based on a mobile device identifier for mobile device 210. In some implementations, the session cookie may store the mobile device identifier for mobile device 210.

In some implementations, the session cookie may be set to the domain of backend device 230. In some implementations, backend device 230 may generate and store (e.g., in a ratable data structure) a mapping between the mobile device identifier for mobile device 210, the application identifier for the application requested by mobile device 210, mobile device 210's OS, and/or the session cookie.

As shown in FIG. 4, process 400 may include sending to the mobile device, based on the request for the intermediate web page, a redirect to a software distribution platform, the redirect causing the mobile device to obtain the application from the software distribution platform (block 420). For example, based on receiving the request for the intermediate web page, backend device 230 may send, to mobile device 210, a redirect message (e.g., an HTTP 302 redirect), which redirects mobile device 210 to software distribution platform 240. In some implementations, backend device 230 may send the redirect in response to the request, received from mobile device 210, for the intermediate web page. In some implementations, the redirect may include the session cookie generated by backend device 230.

In some implementations, the redirect may be to a software distribution platform that is appropriate for an OS (e.g., the Android OS, the iPhone OS (iOS), or the Windows OS) being used by mobile device 210 (e.g., as determined by backend device 230 based on the request, received front mobile device 210, for the intermediate web page). For example, backend device 230 may send a redirect that redirects mobile device 210 to a software distribution platform that provides applications compatible with mobile device 210's OS.

In some implementations, the redirect may cause mobile device 210 to obtain the application from software distribution platform 240. For example, based on receiving the redirect from backend device 230, mobile device 210 may send a request, to software distribution platform 240, to obtain the application.

In some implementations, mobile device 210 may send a registration request to message server 250 (e.g., after mobile device 210 obtains the application). For example, mobile device 210 may register, with message server 250, to receive messages (e.g., push notifications) from message server 250.

In some implementations, the application may send the registration request to message server 250. For example, after obtaining the application, from software distribution platform 240, mobile device 210 may launch the application. When the application launches (e.g., for the first time), the application may cause mobile device 210 to send the registration request to message server 250.

In some implementations, mobile device 210 may receive, from message server 250, a registration identifier based on the registration request sent to message server 250. In some implementations, message server 250 may use the registration identifier to identify mobile device 210 as a target to receive messages (e.g., push notifications) from message server 250. For example, message server 250 may assign the registration identifier to the instance of the application that is associated with mobile device 210, and which sent the registration request to message server 250.

As shown in FIG. 4, process 400 may include receiving, from the mobile device, a registration request, the registration request including a registration identifier received by the mobile device from a message server (block 425). For example, backend device 230 may receive, from mobile device 210, a registration request that includes a registration identifier, which mobile device 210 received from message server 250.

In some implementations, the registration request may include the registration identifier, the session cookie, and the application identifier. For example, software on mobile device 210, that is associated with the application and/or backend device 230 (e.g., a library, an API, or an SDK), may obtain the registration identifier, the session cookie, and the application identifier and may cause mobile device 210 to send, to backend device 230, the registration request. In some implementations, the registration request may additionally include an indication of mobile device 210's OS.

As shown in FIG. 4, process 400 may include mapping the mobile device identifier to the registration identifier (block 430). For example, backend device 230 may obtain a mobile device identifier for mobile device 210 from the session cookie that was included in the registration request. Backend device 230 may then map the mobile device identifier to the registration identifier, which was also included in the registration request.

In some implementations, backend device 230 may additionally map other information to the registration identifier and/or the mobile device identifier. For example, backend device 230 may map, to the registration identifier and/or the mobile device identifier, the application identifier, an indication of mobile device 210's OS, information regarding a registration time (e.g., as may have been obtained, from message server 250, by mobile device 210), or the like. In some implementations, backend device 230 may store the mobile device identifier, the registration identifier, the mapping of the mobile device identifier to the registration identifier, and any other mapped information in a suitable data structure.

As shown in FIG. 4, process 400 may include sending, to the message server, a request, based on the registration identifier, to cause the message server to send, to the mobile device, a message based on the application (block 435). For example, backend device 230 may send, to message server 250, a request, for messaging to mobile device 210. The request, for messaging to mobile device 210, may cause message server 250 to send a message to mobile device 210.

In some implementations, backend device 230 may use the stored mapping of the mobile device identifier to the registration identifier such that the request, for messaging to mobile device 210, may be based on the registration identifier. For example, backend device 230 may receive, from third party device 220, a request to send messages to mobile device 210. The request to send messages to mobile device 210, received from third party device 220, may be based on a mobile device identifier for mobile device 210. Backend device 230 may use the stored mapping of the mobile device identifier to the registration identifier to determine a registration identifier that backend device 230 may use to request that message server 250 send a message to mobile device 210.

In some implementations, the message (e.g., a push notification), to be sent by message server 250 to mobile device 210, may be based on the application. For example the message to be sent to mobile device 210 may include a link (e.g., a URL) to the application.

In some implementations, the link to the application may be to a specific location and/or to specific content within the application (e.g., the link may be a deep link). For example, the message to be sent to mobile device 210 may include a uniform resource identifier (URI) (e.g., a URL) that links to a specific location within the application rather than simply launching the application. In some implementations, the URI may include the information needed to launch directly into a particular location within an application (e.g., a particular page within a particular application). Linking to a specific location and/or to specific content within an application may reduce resources (e.g., processing and power) that might otherwise be consumed by mobile device 210 white navigating through the application to the specific location and/or the specific content.

In some implementations, where third party device 220 includes an IVR system, third party device 220 may respond to subsequent calls, from mobile device 210 and to the IVR system, by requesting (e.g., through backend device 230 and message server 250) that a push notification be sent to mobile device 210. For example, the push notification sent to mobile device 210 may include a link to a specific location and/or to specific content within the application that may be relevant to the subsequent call to the IVR system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a call flow diagram of an example call flow 500 for sending messages to mobile devices. FIG. 5 shows an example of a mobile device obtaining an application and registering with a message server (e.g., to receive push notifications). The example call flow 500 also shows a backend device mapping a mobile device identifier for the mobile device to a registration identifier and then requesting messaging to the mobile device.

As shown in FIG. 5, and by reference number 502, mobile device 210 may send, to third party device 220, a request for an application. As shown by reference number 504, third party device 220 may send, to backend device 230, a request for the application. The request for the application may include a mobile device identifier for mobile device 210 and an application identifier for the application. As shown by reference number 506, backend device 230 may generate a URL for an intermediate web page. As shown by reference number 508, backend device 230 may send the URL to mobile device 210.

As shown by reference number 510, mobile device 210 may access the intermediate web page. As shown by reference number 512, backend device 230 may determine an OS for mobile device 210, generate a cookie based on the mobile device identifier for mobile device 210, and store the mobile device identifier and the application identifier. As shown by reference number 514, backend device 230 may send, to mobile device 210, a redirect to software distribution platform 240. The redirect, sent to mobile device 210, may include the cookie.

As shown by reference number 516, mobile device 210 may request and receive, from software distribution platform, the application. As shown by reference number 518, mobile device 210 may launch the application. As shown by reference number 520, mobile device 210 may send, to message server 250, a registration request for messaging service. As shown by reference number 522, mobile device 210 may receive, from message server, a registration identifier.

As shown by reference number 524, mobile device 210 may obtain the cookie. As shown by reference number 526, mobile device 210 may send a registration request to backend device 230. The registration request may include the application identifier, the registration identifier, and the cookie (e.g., based on the mobile device identifier for mobile device 210). As shown by reference number 528, backend device 230 may map the mobile device identifier for mobile device 210 to the registration identifier.

As shown by reference number 530, backend device 230 may send, to message server 250, a request for a message to be sent to mobile device 210. The request may be based on the registration identifier and may include information (e.g., a link or deep link) regarding the application. As shown by reference number 532, message server 250 may tend a message to mobile device 210. The message may include information (e.g., the link or deep link) regarding the application.

As indicated above, FIG. 5 is provided merely as an example. Other examples are possible and may differ from what was described with regard to FIG. 5.

Implementations described herein may map mobile device identifiers to registration identifiers (received from a message server). Mapping mobile device identifiers to registration identifiers may enable a third party to have messages (e.g., push notifications) sent to mobile devices, by the message server, based on the mobile device identifiers. Sending messages to mobile devices, based on mobile device identifiers for the mobile devices, may enable the third party to target particular mobile devices to receive messages rather than sending messages indiscriminately to mobile devices. Targeting particular mobile devices to receive messages may reduce consumption of network resources. Additionally, enabling the third party to have messages sent to mobile devices based on mobile device identifiers that are known by the third party may additionally reduce computing resources otherwise expended by the third party to determine registration identifiers assigned to the mobile devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive, from a mobile device, a first request for the mobile device to obtain an application,
      the first request including a mobile device identifier for the mobile device;
   send, to the mobile device and based on the first request, a link to a web page;
   receive, from the mobile device, a second request for the web page;
   send, to the mobile device and based on the second request, a redirect to a software distribution platform to obtain the application from the software distribution platform,
      the redirect causing the mobile device to obtain the application from the software distribution platform;
   receive a registration identifier for the mobile device after the mobile device obtains the application from the software distribution platform,
      the registration identifier being received by the mobile device from a message server;
   map the mobile device identifier from a session cookie to the registration identifier,
      the mobile device identifier including one of:
         a mobile device number (MDN),
         an international mobile subscriber identity (IMSI), or
         a temporary mobile subscriber identity (TMSI);
   store information associated with the mapping of the mobile device identifier to the registration identifier and at least one of:
      an application identifier,
      information associated with an operating system of the mobile device, or
      information associated with a registration time;
   send, to the message server, a third request for a message to be sent to the mobile device,
      the third request being based on the registration identifier and the application; and
   receive, from a third party device and before sending the third request, a fourth request to send the message to the mobile device,
      the fourth request being based on the mobile device identifier, and
      the third request being based on the fourth request.

2. The device of claim 1, where launching of the application causes the mobile device to send a registration request to the message server.

3. The device of claim 1, where the one or more processors, when receiving the first request for the mobile device to obtain the application, are further to:
   receive the first request for the mobile device to obtain the application via user input associated with a web site.

4. The device of claim 1, where the one or more processors, when sending, to the mobile device, the link to the web page, are to:
   send, to the mobile device, a short message service (SMS) message,
      the SMS message including a uniform resource locator (URL) for the web page.

5. The device of claim 1, where the one or more processors are further to:
   determine the operating system of the mobile device before sending, to the mobile device, the redirect to the software distribution platform; and
   where the redirect to the software distribution platform is based on the operating system.

6. The device of claim 1, where the one or more processors, when receiving the registration identifier for the mobile device, are to:
   receive the registration identifier from the mobile device.

7. The device of claim 1, where the one or more processors, when sending the redirect to the software distribution platform, are to:
   send the redirect to the software distribution platform along with the session cookie.

8. A non-transitory computer-readable medium storing instructions, the instructions comprising:
   one or more instructions that, when executed by one or more processors, cause the one or more processors to:
   receive, from a mobile device, a first request for the mobile device to obtain an application,
      the first request including a mobile device identifier for the mobile device;
   send, to the mobile device, a link to a web page,
      the web page being based on the mobile device identifier;
   receive, from the mobile device, a second request for the web page;
   send, to the mobile device and based on the second request, a redirect to a software distribution platform,
      the redirect causing the mobile device to obtain the application from the software distribution platform;
   receive a registration identifier for the mobile device after the mobile device obtains the application from the software distribution platform,
      the registration identifier being received by the mobile device from a message server;
   map the mobile device identifier from a session cookie to the registration identifier,
      the mobile device identifier including one of:
         a mobile device number (MDN),
         an international mobile subscriber identity (IMSI), or
         a temporary mobile subscriber identity (TMSI);

store information associated with the mapping of the mobile device identifier to the registration identifier and at least one of:
an application identifier,
information associated with an operating system of the mobile device, or
information associated with a registration time;
send, to the message server, a third request for a message to be sent, to the mobile device, based on the registration identifier,
the message being based on the application; and
receive, from a third party device and before sending the third request, a fourth request to send the message to the mobile device,
the fourth request being based on the mobile device identifier, and
the third request being based on the fourth request.

9. The non-transitory computer-readable medium of claim 8, where the first request from the mobile device to obtain the application includes an application identifier.

10. The non-transitory computer-readable medium of claim 8, where the one or more instructions, when executed by the one or more processors, further cause the one or more processors to:
generate a unique uniform resource locator (URL) for each pairing of a mobile device identifier and an application identifier.

11. The non-transitory computer-readable medium of claim 8, where the one or more instructions, that cause the one or more processors to send, to the mobile device, the link to the web page, cause the one or more processors to:
send, to the mobile device, a short message service (SMS) message,
the SMS message including a uniform resource locator (URL) for the web page.

12. The non-transitory computer-readable medium of claim 11, where the second request for the web page is initiated based on the URL for the web page in the SMS message.

13. The non-transitory computer-readable medium of claim 8, where the one or more instructions, that cause the one or more processors to receive the registration identifier for the mobile device, cause the one or more processors to:
receive the registration identifier from the mobile device.

14. The non-transitory computer-readable medium of claim 8, where the message includes a uniform resource identifier (URI) for at least one of:
a specific location within the application, or
a specific content within the application.

15. A method, comprising:
receiving, by a device and from a mobile device, a first request for the mobile device to obtain an application,
the first request including a mobile device identifier for the mobile device, and
the first request being received from a third party device;
sending, by the device, to the mobile device, and based on the first request, a link to a web page;
receiving, by the device and from the mobile device, a second request for the web page;
sending, by the device and to the mobile device, a redirect based on the second request,
the redirect causing the mobile device to obtain the application from a software distribution platform;
receiving, by the device, a registration identifier for the mobile device after the mobile device obtains the application from the software distribution platform,
the registration identifier being received by the mobile device from a message server;
mapping, by the device, the mobile device identifier from a session cookie to the registration identifier,
the mobile device identifier including one of:
a mobile device number (MDN),
an international mobile subscriber identity (IMSI), or
a temporary mobile subscriber identity (TMSI);
storing, by the device,
store information associated with the mapping of the mobile device identifier to the registration identifier and at least one of:
an application identifier,
information associated with an operating system of the mobile device, or information associated with a registration time;
sending, by the device and to the message server, a third request based on the registration identifier,
the third request causing the message server to send a message to the mobile device,
the message being based on the application; and
receiving, by the device, from a third party device, and before sending the third request, a fourth request to send the message to the mobile device,
the fourth request being based on the mobile device identifier, and
the third request being based on the fourth request.

16. The method of claim 15, further comprising:
generating the session cookie for the mobile device based on the mobile device identifier,
the session cookie to store the mobile device identifier.

17. The method of claim 16,
where the mapping is between the mobile device identifier, the application identifier, the operating system of the mobile device, and the session cookie.

18. The method of claim 15, where sending, to the mobile device, the link to the web page comprises:
sending, to the mobile device, a short message service (SMS) message,
the SMS message including a uniform resource locator (URL) for the web page; and
where the web page is based on at least one of the mobile device identifier or the application.

19. The method of claim 15, further comprising:
determining the operating system of the mobile device before sending the redirect based on the second request; and
selecting the software distribution platform based on the operating system for the mobile device.

20. The method of claim 15, where the message includes a uniform resource identifier (URI) for at least one of:
a specific location within the application, or
a specific content within the application.

* * * * *